(12) United States Patent
Cholst

(10) Patent No.: US 12,376,515 B2
(45) Date of Patent: Aug. 5, 2025

(54) STRING TRIMMER ASSEMBLY AND TRIMMER HEAD FOR USE WITH SAME

(71) Applicant: MILWAUKEE ELECTRIC TOOL CORPORATION, Brookfield, WI (US)

(72) Inventor: Beth E. Cholst, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 428 days.

(21) Appl. No.: 17/855,183

(22) Filed: Jun. 30, 2022

(65) Prior Publication Data

US 2023/0000008 A1   Jan. 5, 2023

Related U.S. Application Data

(60) Provisional application No. 63/216,900, filed on Jun. 30, 2021.

(51) Int. Cl.
*A01D 34/416*   (2006.01)

(52) U.S. Cl.
CPC ..... *A01D 34/4163* (2013.01); *A01D 34/4165* (2013.01); *A01D 34/4167* (2013.01)

(58) Field of Classification Search
CPC ............ A01D 34/4163; A01D 34/4165; A01D 34/4167
See application file for complete search history.

(56) References Cited

U.S. PATENT DOCUMENTS

| | | | |
|---|---|---|---|
| 1,688,914 A | 10/1928 | Ariens | |
| 1,911,623 A | 5/1933 | Karl | |
| 2,020,524 A | 11/1935 | Smithburn | |
| 2,022,335 A | 11/1935 | Bernthal | |
| 2,131,324 A | 9/1938 | Hull | |
| 2,188,644 A | 1/1940 | Short | |
| D130,494 S | 11/1941 | Schmeiser | |
| 2,290,575 A | 7/1942 | Potter | |
| D137,446 S | 3/1944 | Schmeiser | |
| D138,712 S | 9/1944 | Karl | |
| 2,366,624 A | 1/1945 | Kelsey | |
| 2,366,625 A | 1/1945 | Kelsey | |
| 2,388,553 A | 11/1945 | Kraus | |

(Continued)

FOREIGN PATENT DOCUMENTS

| CN | 2862622 Y | 1/2007 |
|---|---|---|
| CN | 100396170 C | 6/2008 |

(Continued)

OTHER PUBLICATIONS

International Search Report and Written Opinion for Application No. PCT/US2022/035794 dated Oct. 21, 2022 (10 pages).

(Continued)

*Primary Examiner* — Omar Flores Sanchez

(74) *Attorney, Agent, or Firm* — Dority & Manning, P.A.

(57) ABSTRACT

A string trimmer assembly includes a trimmer head rotatably driven by a drive shaft and defining a cavity, a spool supported in the cavity of the trimmer head and operable to support line to be dispensed, which is dispensable though an opening in the trimmer head, and a bump protruding from a distal end of the trimmer head. The bump includes a wear surface on a terminating end of the bump, and the wear surface and the opening define a cutting height.

9 Claims, 6 Drawing Sheets

(56) References Cited

U.S. PATENT DOCUMENTS

| | | |
|---|---|---|
| 2,430,148 A | 11/1947 | Traver |
| 2,438,707 A | 3/1948 | Kropp |
| 2,455,147 A | 11/1948 | Traver |
| 2,455,148 A | 11/1948 | Traver |
| 2,491,892 A | 12/1949 | Claus |
| 2,501,364 A | 3/1950 | Traver |
| 2,551,132 A | 5/1951 | Jacobus |
| 2,560,359 A | 7/1951 | McCardell |
| 2,575,223 A | 11/1951 | Madill |
| 2,593,065 A | 4/1952 | Simon |
| 2,595,537 A | 5/1952 | Elmer |
| 2,603,139 A | 7/1952 | Johnson |
| 2,614,375 A | 10/1952 | Calkins |
| 2,614,474 A | 10/1952 | Merry |
| 2,634,666 A | 4/1953 | Merry |
| 2,679,794 A | 6/1954 | Ober |
| 2,683,406 A | 7/1954 | Kelsey |
| 2,684,022 A | 7/1954 | Smithburn |
| 2,691,933 A | 10/1954 | Emerson |
| 2,748,683 A | 6/1956 | Milan |
| 2,751,833 A | 6/1956 | Glynn |
| 2,762,073 A | 9/1956 | Lombardi |
| 2,796,819 A | 6/1957 | Arvid |
| 2,803,183 A | 8/1957 | Smithburn |
| 2,812,701 A | 11/1957 | Weaver, Jr. |
| 2,816,495 A | 12/1957 | Brooks |
| 2,832,184 A | 4/1958 | Beuerle |
| 2,835,182 A | 5/1958 | Smithburn |
| 2,847,922 A | 8/1958 | Stephenson |
| 2,847,924 A | 8/1958 | Quick |
| 2,888,994 A | 6/1959 | Hoff et al. |
| 2,903,077 A | 9/1959 | Igor |
| 3,151,685 A | 10/1964 | Field |
| 3,173,498 A | 3/1965 | Harold |
| 3,203,487 A | 8/1965 | Whitesides |
| 3,212,585 A | 10/1965 | Bezzerides |
| 3,213,514 A | 10/1965 | James |
| 3,233,685 A | 2/1966 | Brewer |
| 3,233,686 A | 2/1966 | Steadman |
| 3,306,371 A | 2/1967 | Bush |
| 3,362,482 A | 1/1968 | Riddle |
| 3,375,879 A | 4/1968 | Troyer et al. |
| 3,397,748 A | 8/1968 | Whitesides |
| 3,435,904 A | 4/1969 | Rice |
| 3,442,335 A | 5/1969 | Silbereis et al. |
| D221,461 S | 8/1971 | Hagenstad |
| 3,605,907 A | 9/1971 | Schuring et al. |
| 3,664,102 A | 5/1972 | Reber |
| 3,698,485 A | 10/1972 | Trimpe et al. |
| 3,702,638 A | 11/1972 | Takata |
| D225,551 S | 12/1972 | Moore |
| D225,553 S | 12/1972 | Moore |
| 3,734,201 A | 5/1973 | Zaun |
| 3,755,845 A | 9/1973 | Coult |
| 3,760,884 A | 9/1973 | Webster et al. |
| 3,781,991 A | 1/1974 | Stretton et al. |
| 3,868,741 A | 3/1975 | Coult |
| 3,892,278 A | 7/1975 | Smith et al. |
| 4,006,528 A | 2/1977 | Katsuya |
| 4,007,525 A | 2/1977 | Utter |
| 4,043,399 A | 8/1977 | Morrison |
| 4,043,404 A | 8/1977 | Sorlie et al. |
| 4,044,841 A | 8/1977 | Smith et al. |
| 4,047,299 A | 9/1977 | Bair |
| 4,047,576 A | 9/1977 | Rau et al. |
| 4,049,059 A | 9/1977 | Weibling |
| 4,062,408 A | 12/1977 | Enters et al. |
| 4,068,377 A | 1/1978 | Kimmel et al. |
| D247,567 S | 3/1978 | Haataja |
| 4,094,363 A | 6/1978 | McCoomb |
| 4,095,338 A | 6/1978 | Naohiko et al. |
| 4,097,991 A | 7/1978 | Proulx |
| 4,098,349 A | 7/1978 | Jilani |
| 4,100,971 A | 7/1978 | Honnold |
| 4,113,027 A | 9/1978 | Van Der |
| 4,118,132 A | 10/1978 | Dobberpuhl |
| 4,133,390 A | 1/1979 | Reaume |
| 4,151,646 A | 5/1979 | Lane |
| 4,151,883 A | 5/1979 | Van Der et al. |
| 4,161,820 A | 7/1979 | Moore |
| 4,167,812 A | 9/1979 | Moore |
| 4,168,572 A | 9/1979 | Ewing |
| 4,183,138 A | 1/1980 | Mitchell et al. |
| 4,189,830 A | 2/1980 | Pittinger, Jr. |
| 4,189,833 A | 2/1980 | Kwater |
| 4,195,408 A | 4/1980 | Palmieri et al. |
| 4,214,632 A | 7/1980 | Brookshier |
| 4,236,311 A | 12/1980 | Mitchell |
| 4,237,610 A | 12/1980 | Bradus et al. |
| 4,250,621 A | 2/1981 | Houle |
| 4,250,622 A | 2/1981 | Houle |
| 4,253,238 A | 3/1981 | Sheldon |
| 4,256,183 A | 3/1981 | Hanley |
| 4,258,635 A | 3/1981 | Lutz et al. |
| 4,267,891 A | 5/1981 | Van Der et al. |
| 4,269,372 A | 5/1981 | Kwater |
| 4,271,595 A | 6/1981 | Rahe |
| 4,274,201 A | 6/1981 | Oberg et al. |
| 4,276,940 A | 7/1981 | Kirkegaard |
| 4,278,133 A | 7/1981 | De Marcellus |
| 4,290,488 A | 9/1981 | Pelsy |
| 4,307,479 A | 12/1981 | Mertes et al. |
| 4,346,764 A | 8/1982 | Rossi |
| 4,349,962 A | 9/1982 | Itagaki et al. |
| 4,362,074 A | 12/1982 | Kwater |
| 4,364,437 A | 12/1982 | Haapala |
| 4,372,397 A | 2/1983 | Goertzen et al. |
| 4,373,590 A | 2/1983 | Wittrock |
| 4,398,606 A | 8/1983 | Herscher |
| 4,398,608 A | 8/1983 | Boetto |
| 4,402,365 A | 9/1983 | Goertzen |
| 4,411,322 A | 10/1983 | Linger |
| 4,412,382 A | 11/1983 | White, III |
| 4,412,588 A | 11/1983 | Van Der et al. |
| 4,415,041 A | 11/1983 | Fackler |
| 4,421,176 A | 12/1983 | Tuggle et al. |
| 4,421,178 A | 12/1983 | Vandelli et al. |
| 4,424,869 A | 1/1984 | Vom Braucke et al. |
| 4,426,780 A | 1/1984 | Foster |
| 4,458,419 A | 7/1984 | Proulx |
| 4,467,874 A | 8/1984 | Wittrock |
| 4,490,910 A | 1/1985 | Mattson et al. |
| 4,492,271 A | 1/1985 | Doering |
| 4,515,222 A | 5/1985 | Der |
| 4,524,515 A | 6/1985 | Oberg |
| 4,561,180 A | 12/1985 | Pittinger, Sr. et al. |
| 4,611,669 A | 9/1986 | Ballard |
| 4,629,007 A | 12/1986 | Pegoraro |
| 4,633,588 A | 1/1987 | Pittinger, Jr. |
| 4,646,850 A | 3/1987 | Brown et al. |
| 4,656,739 A | 4/1987 | Pittinger, Jr. |
| 4,658,910 A | 4/1987 | Garriss |
| 4,660,286 A | 4/1987 | Engelbrecht et al. |
| 4,672,798 A | 6/1987 | Ota |
| 4,678,043 A | 7/1987 | Vom Braucke et al. |
| 4,702,005 A | 10/1987 | Pittinger, Sr. et al. |
| 4,706,761 A | 11/1987 | Herscher et al. |
| D293,342 S | 12/1987 | Thomson et al. |
| 4,736,573 A | 4/1988 | Seck et al. |
| 4,744,148 A | 5/1988 | Brown |
| 4,776,290 A | 10/1988 | Rau et al. |
| 4,776,405 A | 10/1988 | Grieder et al. |
| D300,141 S | 3/1989 | Kawashima |
| 4,817,732 A | 4/1989 | Brown |
| 4,871,031 A | 10/1989 | Kestel |
| 4,882,843 A | 11/1989 | Baba |
| 4,888,871 A | 12/1989 | Engelbrecht |
| 4,942,664 A | 7/1990 | Zatulovsky |
| 5,010,720 A | 4/1991 | Corsi |
| 5,020,224 A * | 6/1991 | Haupt ............... A01D 34/4162 30/276 |
| 5,025,615 A | 6/1991 | Hawkenson |
| 5,029,361 A | 7/1991 | Murata et al. |
| 5,033,259 A | 7/1991 | Adcock |

(56) References Cited

U.S. PATENT DOCUMENTS

| | | |
|---|---|---|
| 5,048,616 A | 9/1991 | Hoff |
| 5,056,181 A | 10/1991 | Tsuchiya et al. |
| 5,063,673 A | 11/1991 | Webster |
| 5,063,731 A | 11/1991 | Hull et al. |
| 5,082,063 A | 1/1992 | Sidders |
| 5,109,976 A | 5/1992 | Mohri et al. |
| 5,136,782 A | 8/1992 | Calcinai |
| 5,148,569 A | 9/1992 | Jailor et al. |
| 5,158,145 A | 10/1992 | Karchewski |
| 5,159,845 A | 11/1992 | Wada et al. |
| 5,224,553 A | 7/1993 | Heintzman |
| 5,267,517 A | 12/1993 | Jones |
| 5,299,647 A | 4/1994 | Mudd et al. |
| 5,339,526 A | 8/1994 | Everts |
| 5,351,565 A | 10/1994 | Wada et al. |
| 5,361,570 A | 11/1994 | Bernardy |
| 5,375,284 A | 12/1994 | Deimel et al. |
| 5,394,612 A | 3/1995 | Wolfington |
| 5,443,023 A | 8/1995 | Carroll |
| 5,507,351 A | 4/1996 | Martin |
| 5,524,349 A | 6/1996 | Dolin |
| 5,645,000 A | 7/1997 | Carroll |
| 5,662,173 A | 9/1997 | Blesing |
| 5,765,287 A | 6/1998 | Griffini et al. |
| 5,806,294 A | 9/1998 | Strieber |
| 5,810,093 A | 9/1998 | Howard |
| 5,850,882 A | 12/1998 | Link |
| 5,855,068 A | 1/1999 | Zilly et al. |
| 5,875,700 A | 3/1999 | Powell |
| 5,931,605 A | 8/1999 | Toor et al. |
| 5,950,317 A | 9/1999 | Yates et al. |
| 5,960,889 A | 10/1999 | Mclaren |
| 5,996,234 A | 12/1999 | Fowler et al. |
| 6,017,169 A | 1/2000 | Toor et al. |
| D421,026 S | 2/2000 | Bruns et al. |
| 6,021,630 A | 2/2000 | Higashi et al. |
| 6,052,976 A | 4/2000 | Cellini et al. |
| 6,065,214 A | 5/2000 | Nagashima |
| 6,167,973 B1 | 1/2001 | Nagashima |
| 6,263,580 B1 * | 7/2001 | Stark ................ A01D 34/4163 30/276 |
| 6,272,756 B1 | 8/2001 | Peterson et al. |
| 6,293,349 B1 | 9/2001 | Marshall et al. |
| 6,311,398 B1 | 11/2001 | Peterson et al. |
| 6,364,030 B1 | 4/2002 | Pfeiffer et al. |
| 6,367,561 B1 | 4/2002 | Firdaus |
| 6,422,194 B2 | 7/2002 | Ito et al. |
| 6,446,346 B1 | 9/2002 | Castleman |
| D467,944 S | 12/2002 | Stark |
| 6,487,780 B1 | 12/2002 | Peterson et al. |
| 6,488,101 B1 | 12/2002 | Miyahara et al. |
| 6,494,176 B2 | 12/2002 | Ito et al. |
| 6,497,044 B2 | 12/2002 | Yamane et al. |
| D469,447 S | 1/2003 | Stark |
| 6,505,596 B2 | 1/2003 | Ito et al. |
| 6,508,224 B2 | 1/2003 | Ito et al. |
| 6,519,857 B1 | 2/2003 | Proulx et al. |
| 6,523,618 B2 | 2/2003 | Firdaus |
| 6,540,031 B1 | 4/2003 | Sasaoka |
| 6,578,270 B2 | 6/2003 | Hiratsuna et al. |
| 6,594,907 B2 | 7/2003 | Wilson et al. |
| 6,612,376 B2 | 9/2003 | Sergyeyenko et al. |
| 6,640,449 B1 | 11/2003 | Hoffmann et al. |
| 6,644,416 B2 | 11/2003 | Teeple |
| 6,666,009 B1 * | 12/2003 | Brandon ............ A01D 34/4166 30/276 |
| 6,672,273 B2 | 1/2004 | Ito et al. |
| 6,705,263 B2 | 3/2004 | Ito et al. |
| 6,708,774 B2 | 3/2004 | Miyahara et al. |
| 6,722,041 B2 | 4/2004 | Warashina et al. |
| 6,739,058 B2 | 5/2004 | Warashina et al. |
| 6,739,403 B2 | 5/2004 | Firdaus |
| 6,754,962 B2 | 6/2004 | Warashina et al. |
| 6,754,963 B2 | 6/2004 | Warashina et al. |
| 6,754,964 B2 | 6/2004 | Sugihara et al. |
| 6,757,980 B2 | 7/2004 | Arsenault |
| 6,766,866 B2 | 7/2004 | Miyahara et al. |
| 6,779,274 B2 | 8/2004 | Peterson et al. |
| 6,782,863 B2 | 8/2004 | Leasure et al. |
| 6,810,849 B1 | 11/2004 | Hirsch et al. |
| 6,823,947 B2 | 11/2004 | Nagaoka et al. |
| 6,834,633 B2 | 12/2004 | Sing et al. |
| 6,854,525 B2 | 2/2005 | Martindale |
| D503,938 S | 4/2005 | Vasilescu |
| 6,904,977 B2 | 6/2005 | Zerrer et al. |
| 6,926,090 B2 | 8/2005 | Sergyeyenko et al. |
| 6,926,091 B2 | 8/2005 | Lee |
| 6,938,587 B2 | 9/2005 | Thomas et al. |
| 6,944,954 B1 | 9/2005 | Arnetoli |
| 6,952,877 B2 | 10/2005 | Pfaltzgraff |
| 6,997,812 B2 | 2/2006 | Sasaki et al. |
| 7,000,324 B2 | 2/2006 | Fogle |
| 7,017,272 B2 | 3/2006 | Grace |
| D518,831 S | 4/2006 | Bowsher |
| D519,526 S | 4/2006 | Bowsher |
| D523,028 S | 6/2006 | Fitzpatrick |
| 7,059,106 B2 | 6/2006 | Brandon |
| 7,096,966 B2 | 8/2006 | Eberhardt et al. |
| 7,171,723 B2 | 2/2007 | Kobayashi et al. |
| 7,171,798 B1 | 2/2007 | Bernardy |
| 7,251,857 B2 | 8/2007 | Caruso |
| 7,275,324 B2 | 10/2007 | Proulx |
| 7,302,790 B2 | 12/2007 | Brandon |
| 7,303,025 B2 | 12/2007 | Mayer |
| 7,395,601 B2 | 7/2008 | Berfield |
| 7,412,768 B2 | 8/2008 | Alliss |
| 7,480,998 B2 | 1/2009 | Suzuki et al. |
| 7,484,568 B2 | 2/2009 | Vasilescu |
| 7,513,046 B2 | 4/2009 | Proulx |
| D598,255 S | 8/2009 | Alliss |
| 7,575,066 B2 | 8/2009 | Bauer |
| 7,581,322 B2 | 9/2009 | Proulx |
| 7,594,334 B2 | 9/2009 | Kocha |
| 7,607,232 B2 | 10/2009 | Pfaltzgraff |
| D607,017 S | 12/2009 | Fraley et al. |
| 7,624,814 B2 | 12/2009 | Skolness |
| 7,640,668 B2 | 1/2010 | Iacona |
| 7,640,995 B2 | 1/2010 | Knobloch |
| 7,661,252 B2 | 2/2010 | Kitamura |
| D611,507 S | 3/2010 | Martin |
| 7,753,133 B2 | 7/2010 | Skolness |
| 7,762,002 B2 | 7/2010 | Proulx |
| 7,797,839 B2 | 9/2010 | Proulx |
| 7,814,984 B1 | 10/2010 | Fraley et al. |
| 7,878,260 B2 | 2/2011 | Notaras et al. |
| 7,882,642 B2 | 2/2011 | Proulx |
| 7,963,344 B2 | 6/2011 | Marcil et al. |
| 7,979,991 B2 | 7/2011 | Pfaltzgraff |
| 7,984,573 B2 | 7/2011 | Lau |
| 8,001,694 B2 | 8/2011 | Sing et al. |
| 8,025,249 B2 | 9/2011 | Alliss et al. |
| 8,122,554 B2 | 2/2012 | Schemmel et al. |
| 8,162,072 B2 | 4/2012 | Marcil et al. |
| 8,181,711 B1 | 5/2012 | Fraley et al. |
| 8,186,450 B2 | 5/2012 | Bauer |
| 8,210,272 B2 | 7/2012 | Notaras et al. |
| 8,230,602 B2 | 7/2012 | Arnetoli |
| 8,261,846 B2 | 9/2012 | Fraley et al. |
| 8,266,805 B1 | 9/2012 | Alliss |
| 8,297,034 B1 | 10/2012 | Mueller |
| 8,327,947 B2 | 12/2012 | Martindale et al. |
| 8,347,443 B1 | 1/2013 | Conrad |
| 8,429,886 B2 | 4/2013 | Kato et al. |
| 8,434,563 B2 | 5/2013 | Gendelman et al. |
| 8,464,431 B2 | 6/2013 | Reynolds et al. |
| 8,496,069 B2 | 7/2013 | Gendelman et al. |
| 8,496,071 B2 | 7/2013 | Fraley et al. |
| 8,510,960 B2 | 8/2013 | Pfaltzgraff et al. |
| D690,063 S | 9/2013 | Kent et al. |
| 8,549,827 B2 | 10/2013 | Kato et al. |
| 8,567,073 B2 | 10/2013 | Proulx |
| 8,567,074 B2 | 10/2013 | Arnetoli |
| 8,568,051 B2 | 10/2013 | Burnett |
| 8,607,889 B2 | 12/2013 | Marcil et al. |

(56) References Cited

U.S. PATENT DOCUMENTS

| | | |
|---|---|---|
| 8,615,887 B2 | 12/2013 | Arnetoli |
| 8,627,897 B2 | 1/2014 | Marcil et al. |
| 8,627,898 B2 | 1/2014 | Nance |
| 8,701,621 B2 | 4/2014 | Takeda et al. |
| 8,707,567 B2 | 4/2014 | Proulx |
| 8,745,879 B2 | 6/2014 | Alliss |
| 8,745,880 B2 | 6/2014 | Kato |
| 8,776,910 B1 | 7/2014 | Dallas et al. |
| D718,345 S | 11/2014 | Whalen |
| 8,910,387 B2 | 12/2014 | Alliss |
| 8,910,388 B2 | 12/2014 | Proulx |
| 8,915,219 B2 | 12/2014 | Nakamura et al. |
| 8,918,999 B2 | 12/2014 | Proulx et al. |
| 8,928,201 B2 | 1/2015 | Tanimoto et al. |
| 8,991,514 B2 | 3/2015 | Tozawa et al. |
| 9,041,320 B2 | 5/2015 | Untermann et al. |
| 9,049,816 B2 | 6/2015 | Ito et al. |
| 9,095,098 B2 | 8/2015 | Guenther et al. |
| 9,144,194 B2 | 9/2015 | Kato |
| 9,160,211 B2 | 10/2015 | Tanimoto et al. |
| 9,167,737 B2 | 10/2015 | McGowen |
| D745,759 S | 12/2015 | Kent et al. |
| 9,204,588 B1 | 12/2015 | Christie et al. |
| 9,224,995 B2 | 12/2015 | Martinsson et al. |
| 9,271,442 B2 | 3/2016 | Pellenc |
| 9,277,687 B2 | 3/2016 | Marcil et al. |
| 9,290,905 B1 | 3/2016 | Diaz et al. |
| 9,295,195 B2 | 3/2016 | Proulx et al. |
| 9,307,687 B2 | 4/2016 | Ruppel et al. |
| 9,320,189 B2 | 4/2016 | Nance |
| 9,322,344 B2 | 4/2016 | Isono et al. |
| 9,345,193 B2 | 5/2016 | Wu |
| 9,357,712 B2 | 6/2016 | Pickett et al. |
| 9,363,946 B2 | 6/2016 | Pellenc |
| 9,366,220 B2 | 6/2016 | Leufen et al. |
| 9,380,743 B2 | 7/2016 | Alliss |
| 9,392,737 B2 | 7/2016 | Sanderson |
| 9,439,339 B2 | 9/2016 | Hurd |
| 9,447,827 B2 | 9/2016 | Yuasa |
| 9,456,723 B2 | 10/2016 | Thorne et al. |
| 9,468,143 B2 | 10/2016 | Stark |
| 9,496,809 B2 | 11/2016 | Nakano et al. |
| 9,516,799 B2 | 12/2016 | Olsen |
| 9,516,807 B2 | 12/2016 | Alliss |
| 9,526,389 B2 | 12/2016 | Thorne et al. |
| 9,655,486 B2 | 5/2017 | Xu et al. |
| 9,670,837 B2 | 6/2017 | Honzawa et al. |
| 9,730,371 B2 | 8/2017 | Ruppel et al. |
| 9,736,974 B2 | 8/2017 | Hurd |
| D796,559 S | 9/2017 | Bruce |
| 9,752,630 B2 | 9/2017 | Yuasa |
| 9,756,783 B2 | 9/2017 | Nojiri et al. |
| 9,763,372 B2 | 9/2017 | Modzik et al. |
| 9,782,884 B2 | 10/2017 | Ota et al. |
| 9,826,679 B2 | 11/2017 | Lang et al. |
| 9,839,172 B2 | 12/2017 | Meier et al. |
| 9,844,189 B2 | 12/2017 | Baker |
| 9,844,307 B2 | 12/2017 | Muir |
| 9,854,738 B2 | 1/2018 | Miller et al. |
| 9,861,033 B2 * | 1/2018 | Skinner ............... A01D 34/4163 |
| 9,872,429 B2 | 1/2018 | Ma et al. |
| 9,877,435 B2 | 1/2018 | Li et al. |
| 9,907,234 B2 | 3/2018 | Poole et al. |
| 9,924,631 B2 | 3/2018 | Alliss |
| 9,955,627 B2 | 5/2018 | Nakano et al. |
| 9,955,832 B2 | 5/2018 | Thorne et al. |
| D825,293 S | 8/2018 | Alliss |
| 10,051,772 B2 | 8/2018 | Freed et al. |
| 10,064,329 B1 | 9/2018 | Lovmark |
| 10,105,832 B2 | 10/2018 | Martinsson et al. |
| 10,130,030 B2 | 11/2018 | Sprungman et al. |
| 10,149,433 B2 | 12/2018 | Wyne |
| 10,159,171 B1 | 12/2018 | Christie et al. |
| D838,811 S | 1/2019 | Kornblum |
| 10,226,157 B2 | 3/2019 | Xu et al. |
| 10,247,165 B2 | 4/2019 | Eto et al. |
| 10,264,725 B2 | 4/2019 | Guo et al. |
| 10,273,112 B2 | 4/2019 | Alliss |
| 10,278,321 B2 | 5/2019 | Parkey |
| 10,299,430 B2 | 5/2019 | Miller et al. |
| 10,314,228 B2 | 6/2019 | Ma et al. |
| 10,314,229 B2 | 6/2019 | Arnetoli |
| 10,327,381 B2 | 6/2019 | Arnetoli |
| 10,334,778 B2 | 7/2019 | Kullberg |
| 10,334,779 B2 | 7/2019 | Kågebäck et al. |
| 10,350,743 B2 | 7/2019 | Fu et al. |
| 10,362,721 B2 | 7/2019 | Hurd |
| 10,368,487 B2 * | 8/2019 | Morabit ............... A01D 34/416 |
| 10,371,044 B2 | 8/2019 | Karrar |
| 10,390,471 B2 | 8/2019 | Bruce |
| 10,398,071 B2 | 9/2019 | Ruppel et al. |
| 10,433,491 B2 | 10/2019 | Li et al. |
| 10,439,415 B2 | 10/2019 | Zhu et al. |
| 10,440,882 B2 | 10/2019 | Guo et al. |
| 10,506,754 B2 | 12/2019 | Christie et al. |
| 10,517,209 B2 | 12/2019 | Kullberg |
| 10,517,210 B2 | 12/2019 | Cabrera |
| 10,517,385 B2 | 12/2019 | Kress |
| 10,537,057 B2 | 1/2020 | Sergyeyenko et al. |
| D878,430 S | 3/2020 | Bruce |
| D878,431 S | 3/2020 | Bruce |
| 10,575,472 B2 | 3/2020 | Baker |
| 10,638,666 B2 | 5/2020 | Fu |
| 10,645,878 B2 | 5/2020 | Zhang et al. |
| 10,645,884 B2 | 5/2020 | Poole et al. |
| RE48,068 E | 6/2020 | Nojiri et al. |
| 10,716,253 B2 | 7/2020 | Zenkus et al. |
| 10,722,023 B2 | 7/2020 | Zhai |
| 10,772,258 B2 | 9/2020 | Sugiyama |
| 10,820,462 B2 | 11/2020 | Christie et al. |
| 10,820,685 B1 | 11/2020 | Becker |
| 10,856,466 B2 | 12/2020 | Guo et al. |
| 2002/0026714 A1 | 3/2002 | Peterson et al. |
| 2002/0073556 A1 | 6/2002 | Fogle |
| 2002/0144408 A1 | 10/2002 | Cho |
| 2002/0189107 A1 | 12/2002 | Arnetoli |
| 2004/0065289 A1 | 4/2004 | Leasure et al. |
| 2004/0123828 A1 | 7/2004 | Sing et al. |
| 2004/0128840 A1 | 7/2004 | Proulx et al. |
| 2004/0148784 A1 | 8/2004 | Grace |
| 2004/0149466 A1 | 8/2004 | Stark |
| 2004/0154276 A1 | 8/2004 | Brandon |
| 2004/0255895 A1 | 12/2004 | Hirsch et al. |
| 2005/0045347 A1 | 3/2005 | Stark et al. |
| 2005/0167125 A1 | 8/2005 | Martindale |
| 2005/0183411 A1 | 8/2005 | Stanley |
| 2005/0252184 A1 | 11/2005 | Craig |
| 2005/0274532 A1 | 12/2005 | Lephart et al. |
| 2006/0053636 A1 | 3/2006 | Fogle |
| 2006/0070753 A1 | 4/2006 | Lephart et al. |
| 2006/0124324 A1 | 6/2006 | Neusink et al. |
| 2006/0191143 A1 | 8/2006 | Brandon |
| 2006/0254061 A1 | 11/2006 | Alliss |
| 2007/0180704 A1 | 8/2007 | Chiu |
| 2007/0180705 A1 | 8/2007 | Chiu |
| 2007/0287571 A1 | 12/2007 | Li |
| 2008/0022484 A1 | 1/2008 | Caruso |
| 2008/0128147 A1 | 6/2008 | Lynch |
| 2008/0201877 A1 | 8/2008 | Sengewald et al. |
| 2008/0236851 A1 | 10/2008 | Winkle |
| 2008/0282554 A1 | 11/2008 | Grace |
| 2009/0044351 A1 | 2/2009 | Menrik et al. |
| 2009/0050341 A1 | 2/2009 | Hathaway et al. |
| 2009/0173053 A1 | 7/2009 | Stanley |
| 2010/0154229 A1 | 6/2010 | Lacona et al. |
| 2010/0186240 A1 | 7/2010 | Waugh |
| 2010/0229403 A1 | 9/2010 | Apfel et al. |
| 2011/0131817 A1 | 6/2011 | Ito |
| 2011/0239468 A1 | 10/2011 | Conlon |
| 2011/0240319 A1 | 10/2011 | Sanderson |
| 2011/0297404 A1 | 12/2011 | Welch |
| 2011/0302791 A1 | 12/2011 | Proulx et al. |
| 2011/0302898 A1 | 12/2011 | Craig |
| 2012/0073258 A1 | 3/2012 | Stanley |

(56) References Cited

U.S. PATENT DOCUMENTS

| | | |
|---|---|---|
| 2012/0104983 A1 | 5/2012 | Tanimoto et al. |
| 2012/0159792 A1 | 6/2012 | Hoelscher |
| 2012/0198706 A1 | 8/2012 | Yang et al. |
| 2012/0234122 A1 | 9/2012 | Naka |
| 2012/0279743 A1 | 11/2012 | Suda et al. |
| 2013/0014996 A1 | 1/2013 | Ruppel et al. |
| 2013/0049477 A1 | 2/2013 | Tozawa et al. |
| 2013/0133903 A1 | 5/2013 | Lipscomb |
| 2013/0180547 A1 | 7/2013 | Kent et al. |
| 2013/0185946 A1 | 7/2013 | Apfel et al. |
| 2014/0053416 A1 | 2/2014 | Proulx |
| 2014/0083375 A1 | 3/2014 | Kawashima et al. |
| 2014/0345893 A1 | 11/2014 | Christie et al. |
| 2015/0068783 A1 | 3/2015 | Pickett et al. |
| 2015/0075010 A1 | 3/2015 | Proulx |
| 2015/0107120 A1 | 4/2015 | Proulx et al. |
| 2016/0007520 A1 | 1/2016 | McGowen |
| 2016/0021818 A1 | 1/2016 | Salsbery |
| 2016/0106034 A1 | 4/2016 | Arnetoli |
| 2016/0128276 A1 | 5/2016 | Arnetoli |
| 2016/0143218 A1 | 5/2016 | Sergyeyenko et al. |
| 2016/0183452 A1 | 6/2016 | Kullberg |
| 2016/0271783 A1 | 9/2016 | Pickett et al. |
| 2016/0305438 A1 | 10/2016 | Yamamoto et al. |
| 2017/0034984 A1 | 2/2017 | Olsen |
| 2017/0094900 A1 | 4/2017 | Arnetoli |
| 2017/0349394 A1 | 12/2017 | Alliss |
| 2018/0020614 A1 | 1/2018 | Alliss |
| 2018/0020615 A1 | 1/2018 | Alliss |
| 2018/0094393 A1 | 4/2018 | Takahashi et al. |
| 2018/0110182 A1 | 4/2018 | Nolin et al. |
| 2018/0116106 A1 | 5/2018 | Kullberg et al. |
| 2018/0132417 A1 | 5/2018 | Alliss |
| 2018/0168098 A1 | 6/2018 | Alliss |
| 2018/0177122 A1 | 6/2018 | Skinner |
| 2018/0263184 A1 | 9/2018 | Cline |
| 2018/0294656 A1 | 10/2018 | Iwata et al. |
| 2018/0325035 A1 | 11/2018 | Chung et al. |
| 2018/0333753 A1 | 11/2018 | Nolin et al. |
| 2019/0059213 A1 | 2/2019 | Sprungman et al. |
| 2019/0075721 A1 | 3/2019 | Cholst et al. |
| 2019/0109478 A1 | 4/2019 | Zhu et al. |
| 2019/0116714 A1 | 4/2019 | Christie et al. |
| 2019/0116728 A1 | 4/2019 | Zenkus et al. |
| 2019/0185289 A1 | 6/2019 | Alliss |
| 2019/0216013 A1 | 7/2019 | Guo et al. |
| 2019/0261549 A1 | 8/2019 | Christie et al. |
| 2019/0261557 A1 | 8/2019 | Ma et al. |
| 2019/0269289 A1 | 9/2019 | Xu et al. |
| 2019/0274500 A1 | 9/2019 | Thorne et al. |
| 2019/0320865 A1 | 10/2019 | Brown et al. |
| 2019/0341794 A1 | 11/2019 | Zhu et al. |
| 2020/0008348 A1 | 1/2020 | Guo et al. |
| 2020/0029497 A1 | 1/2020 | Guo et al. |
| 2020/0030958 A1 | 1/2020 | Chan |
| 2020/0053940 A1 | 2/2020 | Ruppel et al. |
| 2020/0067337 A1 | 2/2020 | Nakamoto et al. |
| 2020/0079614 A1 | 3/2020 | Cigarini et al. |
| 2020/0113131 A1 | 4/2020 | Arnetoli |
| 2020/0129031 A1 | 4/2020 | Kress |
| 2020/0137965 A1 | 5/2020 | Register |
| 2020/0138179 A1 | 5/2020 | Keiser et al. |
| 2020/0139514 A1 | 5/2020 | Clifford et al. |
| 2020/0196533 A1 | 6/2020 | Wu et al. |
| 2020/0198097 A1 | 6/2020 | Keiser et al. |
| 2020/0212837 A1 | 7/2020 | Ichikawa et al. |
| 2020/0212838 A1 | 7/2020 | Nakamoto et al. |
| 2020/0236845 A1 | 7/2020 | Wang et al. |
| 2020/0236848 A1 | 7/2020 | Guo et al. |
| 2020/0236875 A1 | 7/2020 | Poole et al. |
| 2020/0246998 A1 | 8/2020 | Niiyama |
| 2020/0260643 A1 | 8/2020 | Hata et al. |
| 2020/0267902 A1 | 8/2020 | Zhang et al. |
| 2020/0296888 A1 | 9/2020 | Arnetoli |
| 2020/0315089 A1 | 10/2020 | Racz et al. |
| 2021/0015035 A1 | 1/2021 | Guo et al. |
| 2022/0330479 A1 * | 10/2022 | Cholst ............... A01D 34/4168 |
| 2023/0000009 A1 | 1/2023 | Cholst |
| 2023/0000010 A1 | 1/2023 | Cholst et al. |
| 2023/0000011 A1 * | 1/2023 | Cholst ............... A01D 34/4166 |

FOREIGN PATENT DOCUMENTS

| | | |
|---|---|---|
| CN | 201222848 Y | 4/2009 |
| CN | 201450714 U | 5/2010 |
| CN | 201541438 U | 8/2010 |
| CN | 201645232 U | 11/2010 |
| CN | 201839620 U | 5/2011 |
| CN | 102349367 A | 2/2012 |
| CN | 102369810 A | 3/2012 |
| CN | 102388688 A | 3/2012 |
| CN | 202262256 U | 6/2012 |
| CN | 202617619 U | 12/2012 |
| CN | 202818968 U | 3/2013 |
| CN | 202998783 U | 6/2013 |
| CN | 203120459 U | 8/2013 |
| CN | 103299835 A | 9/2013 |
| CN | 203181557 U | 9/2013 |
| CN | 203206734 U | 9/2013 |
| CN | 103404309 A | 11/2013 |
| CN | 203301952 U | 11/2013 |
| CN | 103430687 A | 12/2013 |
| CN | 203435367 U | 2/2014 |
| CN | 203504961 U | 4/2014 |
| CN | 104115609 A | 10/2014 |
| CN | 204069639 U | 1/2015 |
| CN | 204206729 U | 3/2015 |
| CN | 104663026 A | 6/2015 |
| CN | 104782247 A | 7/2015 |
| CN | 104823538 A | 8/2015 |
| CN | 204560136 U | 8/2015 |
| CN | 103548434 B | 9/2015 |
| CN | 204707415 U | 10/2015 |
| CN | 204724895 U | 10/2015 |
| CN | 105052356 A | 11/2015 |
| CN | 204761980 U | 11/2015 |
| CN | 204948761 U | 1/2016 |
| CN | 105284270 A | 2/2016 |
| CN | 105359707 A | 3/2016 |
| CN | 105393695 A | 3/2016 |
| CN | 105393696 A | 3/2016 |
| CN | 205105540 U | 3/2016 |
| CN | 103286393 B | 4/2016 |
| CN | 105507806 A | 4/2016 |
| CN | 205142981 U | 4/2016 |
| CN | 105594362 A | 5/2016 |
| CN | 205232795 U | 5/2016 |
| CN | 205232798 U | 5/2016 |
| CN | 105794342 A | 7/2016 |
| CN | 205357121 U | 7/2016 |
| CN | 205399324 U | 7/2016 |
| CN | 105874918 A | 8/2016 |
| CN | 105874921 A | 8/2016 |
| CN | 205430100 U | 8/2016 |
| CN | 103404294 B | 9/2016 |
| CN | 106235967 A | 12/2016 |
| CN | 106416464 A | 2/2017 |
| CN | 205961825 U | 2/2017 |
| CN | 206007154 U | 3/2017 |
| CN | 104885608 B | 4/2017 |
| CN | 105493662 B | 6/2017 |
| CN | 206251578 U | 6/2017 |
| CN | 106922226 A | 7/2017 |
| CN | 206423136 U | 8/2017 |
| CN | 206547259 U | 10/2017 |
| CN | 107371404 A | 11/2017 |
| CN | 206658380 U | 11/2017 |
| CN | 206743789 U | 12/2017 |
| CN | 206776065 U | 12/2017 |
| CN | 207040310 U | 2/2018 |
| CN | 105612905 B | 3/2018 |
| CN | 207235369 U | 4/2018 |
| CN | 207382811 U | 5/2018 |
| CN | 105917763 B | 6/2018 |

(56) References Cited

FOREIGN PATENT DOCUMENTS

| | | |
|---|---|---|
| CN | 207444904 U | 6/2018 |
| CN | 207505355 U | 6/2018 |
| CN | 108450064 A | 8/2018 |
| CN | 108575123 A | 9/2018 |
| CN | 207869611 U | 9/2018 |
| CN | 207869613 U | 9/2018 |
| CN | 108901311 A | 11/2018 |
| CN | 208079682 U | 11/2018 |
| CN | 208175262 U | 12/2018 |
| CN | 208227601 U | 12/2018 |
| CN | 106034412 B | 1/2019 |
| CN | 208338368 U | 1/2019 |
| CN | 208353830 U | 1/2019 |
| CN | 208387296 U | 1/2019 |
| CN | 109417934 A | 3/2019 |
| CN | 106941788 B | 4/2019 |
| CN | 208708144 U | 4/2019 |
| CN | 208783289 U | 4/2019 |
| CN | 208987318 U | 6/2019 |
| CN | 208987320 U | 6/2019 |
| CN | 208987321 U | 6/2019 |
| CN | 208987324 U | 6/2019 |
| CN | 209057530 U | 7/2019 |
| CN | 209151588 U | 7/2019 |
| CN | 209170912 U | 7/2019 |
| CN | 209201539 U | 8/2019 |
| CN | 209358935 U | 9/2019 |
| CN | 209359016 U | 9/2019 |
| CN | 110291882 A | 10/2019 |
| CN | 110352693 A | 10/2019 |
| CN | 209609119 U | 11/2019 |
| CN | 110557981 A | 12/2019 |
| CN | 209749148 U | 12/2019 |
| CN | 209787751 U | 12/2019 |
| CN | 110679211 A | 1/2020 |
| CN | 209930839 U | 1/2020 |
| CN | 110810044 A | 2/2020 |
| CN | 210168414 U | 3/2020 |
| CN | 111010893 A | 4/2020 |
| CN | 210470200 U | 5/2020 |
| CN | 210580046 U | 5/2020 |
| CN | 109845430 B | 6/2020 |
| CN | 210726020 U | 6/2020 |
| CN | 210781975 U | 6/2020 |
| CN | 211047783 U | 7/2020 |
| CN | 211047784 U | 7/2020 |
| CN | 211152632 U | 8/2020 |
| CN | 211210519 U | 8/2020 |
| CN | 211240702 U | 8/2020 |
| CN | 111615871 A | 9/2020 |
| CN | 111623093 A | 9/2020 |
| CN | 211378812 U | 9/2020 |
| CN | 211457896 U | 9/2020 |
| CN | 105284209 B | 10/2020 |
| CN | 109077437 B | 11/2020 |
| CN | 216399524 U | 4/2022 |
| DE | 559014 C | 9/1932 |
| DE | 585827 C | 10/1933 |
| DE | 606258 C | 11/1934 |
| DE | 632687 C | 7/1936 |
| DE | 1024279 B | 2/1958 |
| DE | 1057371 B | 5/1959 |
| DE | 1837331 U | 9/1961 |
| DE | 2000740 A1 | 8/1971 |
| DE | 2145899 A1 | 3/1972 |
| DE | 2618842 A1 | 11/1977 |
| DE | 3043175 A1 | 10/1982 |
| DE | 3300134 A1 | 7/1983 |
| DE | 8332487 U1 | 6/1985 |
| DE | 8625564 U1 | 12/1986 |
| DE | 8712938 U1 | 12/1987 |
| DE | 3728061 C1 | 7/1988 |
| DE | 9000712 U1 | 3/1990 |
| DE | 9002359 U1 | 5/1990 |
| DE | 9201863 U1 | 6/1992 |
| DE | 9410781 U1 | 11/1994 |
| DE | 4229823 C2 | 5/1995 |
| DE | 4344571 A1 | 6/1995 |
| DE | 19506497 A1 | 10/1996 |
| DE | 29611986 U1 | 10/1996 |
| DE | 19627715 A1 | 4/1998 |
| DE | 19905175 C2 | 11/2000 |
| DE | 10330649 A1 | 1/2005 |
| DE | 102004028912 A1 | 1/2006 |
| DE | 102004041914 A1 | 3/2006 |
| DE | 102005021467 A1 | 11/2006 |
| DE | 202006012391 U1 | 11/2006 |
| DE | 202010003187 U1 | 6/2010 |
| DE | 102007054278 B3 | 7/2010 |
| DE | 202012103230 U1 | 12/2013 |
| DE | 102014010692 A1 | 1/2016 |
| DE | 102015005488 A1 | 11/2016 |
| DE | 202017106599 U1 | 12/2017 |
| DE | 102017126467 A1 | 5/2019 |
| DE | 202020002176 U1 | 7/2020 |
| DE | 202020002177 U1 | 8/2020 |
| EP | 0051175 A1 | 5/1982 |
| EP | 0118315 A2 | 9/1984 |
| EP | 0053839 B1 | 10/1985 |
| EP | 0140989 B1 | 6/1987 |
| EP | 0293675 B1 | 7/1990 |
| EP | 0260643 B1 | 11/1991 |
| EP | 0512784 A1 | 11/1992 |
| EP | 0636307 A1 | 2/1995 |
| EP | 0472102 B1 | 3/1995 |
| EP | 0916242 A2 | 5/1999 |
| EP | 0737415 B1 | 7/1999 |
| EP | 1013158 A1 | 6/2000 |
| EP | 1048193 A1 | 11/2000 |
| EP | 0885553 B1 | 8/2001 |
| EP | 0972436 B1 | 1/2005 |
| EP | 1714537 A1 | 10/2006 |
| EP | 1080618 B1 | 12/2008 |
| EP | 2033507 B1 | 7/2011 |
| EP | 1816265 B1 | 12/2012 |
| EP | 2602504 B1 | 5/2014 |
| EP | 2995186 B1 | 3/2018 |
| EP | 3014975 B1 | 5/2018 |
| EP | 2404491 B1 | 11/2018 |
| EP | 3586607 A1 | 1/2020 |
| EP | 3646756 A1 | 5/2020 |
| JP | 2006020627 A | 1/2006 |
| KR | 101795453 B1 | 12/2017 |
| KR | 1020210053070 A | 5/2021 |
| WO | WO8400465 A1 | 2/1984 |
| WO | WO8803746 A1 | 6/1988 |
| WO | WO9607306 A1 | 3/1996 |
| WO | WO0003583 A2 | 1/2000 |
| WO | WO03011009 A1 | 2/2003 |
| WO | WO2004010766 A1 | 2/2004 |
| WO | WO2005001207 A1 | 1/2005 |
| WO | WO2005043977 A2 | 5/2005 |
| WO | 2005110685 A2 | 11/2005 |
| WO | WO2006061928 A1 | 6/2006 |
| WO | WO2010087970 A1 | 8/2010 |
| WO | WO2010100758 A1 | 9/2010 |
| WO | WO2011035930 A1 | 3/2011 |
| WO | WO2012034355 A1 | 3/2012 |
| WO | WO2012070736 A1 | 5/2012 |
| WO | WO2013125912 A1 | 8/2013 |
| WO | WO2013187812 A1 | 12/2013 |
| WO | WO2014073013 A2 | 5/2014 |
| WO | WO2014119116 A1 | 8/2014 |
| WO | WO2014119174 A1 | 8/2014 |
| WO | WO2014119175 A1 | 8/2014 |
| WO | WO2014119181 A1 | 8/2014 |
| WO | WO2015064291 A1 | 5/2015 |
| WO | WO2015107731 A1 | 7/2015 |
| WO | WO2015137110 A1 | 9/2015 |
| WO | WO2016143161 A1 | 9/2016 |
| WO | WO2017006981 A1 | 1/2017 |
| WO | WO2017046046 A1 | 3/2017 |
| WO | WO2017056591 A1 | 4/2017 |
| WO | 2018057428 A1 | 3/2018 |

(56) References Cited

FOREIGN PATENT DOCUMENTS

| WO | WO2018059713 A1 | 4/2018 |
|---|---|---|
| WO | WO2018068324 A1 | 4/2018 |
| WO | WO2018154147 A1 | 8/2018 |
| WO | WO2018176295 A1 | 10/2018 |
| WO | WO2019154660 A1 | 8/2019 |
| WO | WO2019174863 A1 | 9/2019 |
| WO | WO2019185123 A1 | 10/2019 |
| WO | WO2019192201 A1 | 10/2019 |
| WO | WO2019196677 A1 | 10/2019 |
| WO | WO2020065329 A1 | 4/2020 |

OTHER PUBLICATIONS

Ego, "Power+ 9.5" Cultivator Attachment," <https://egopowerplus.com/multi-head-cultivator-attachment/> web page visited May 2, 2022.

Makita, "XRU17PT 36V (18V x2) LXT® Brushless String Trimmer Kit (5.0Ah)," <https://www.makitatools.com/products/details/XRU17PT> web page visited May 2, 2022.

Makita, "XUX01M5PT 36V (18V x2) LXT® Brushless Couple Shaft Power Head Kit with String Trimmer Attachment (5.0Ah)," <https://www.makitatools.com/products/details/XUX01M5PT> web page visited May 2, 2022.

Makita, "Couple Shaft Power Head and Attachments, " <https://www.makitatools.com/ope/ope-shop/cordless-power-head> web page visited May 2, 2022.

Makita, "XUX01," Parts Breakdown, Rev. 0, Nov. 16, 2017 (6 pages).

Troy-Bilt, "Troy-Bilt Mini-Tiller," Owner/Operator Manual, © 1994 (24 pages).

\* cited by examiner

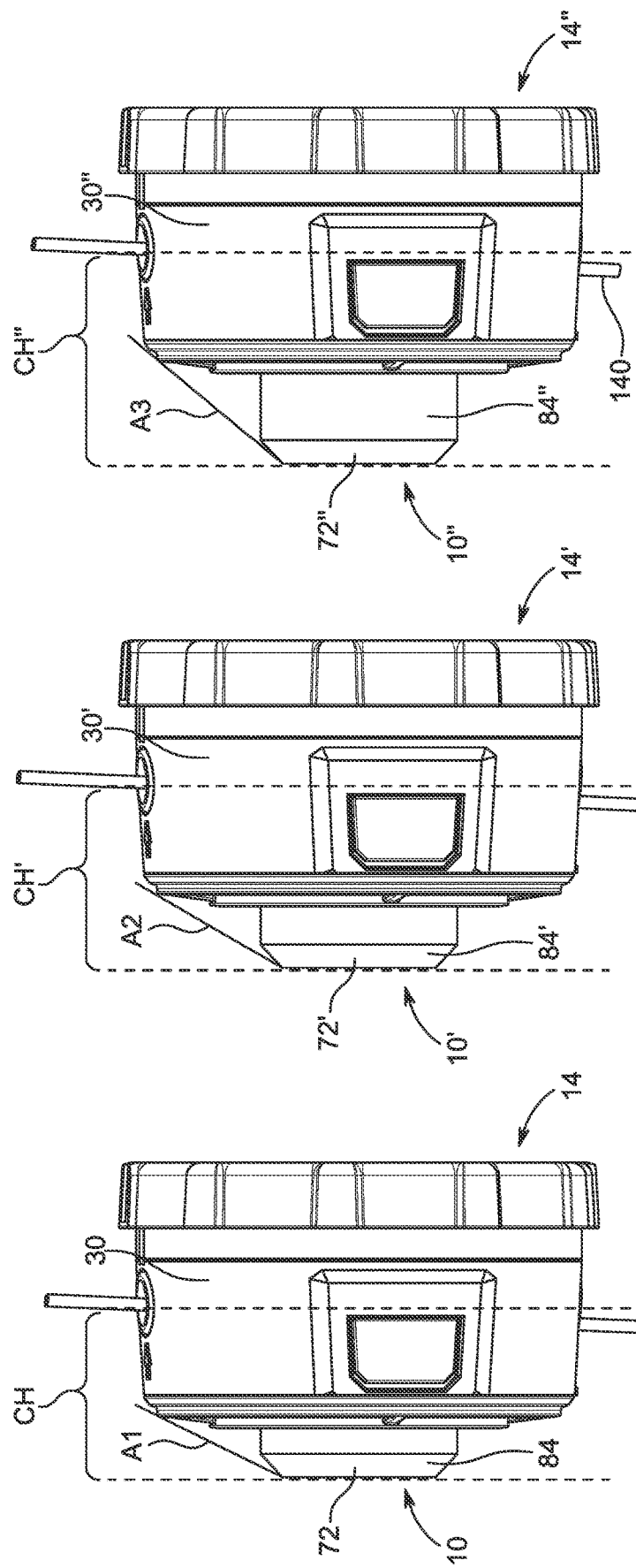

STRING TRIMMER ASSEMBLY AND TRIMMER HEAD FOR USE WITH SAME

CROSS-REFERENCE TO RELATED APPLICATIONS

This application claims priority to U.S. Provisional Patent Application No. 63/216,900, filed Jun. 30, 2021, the entire contents of which are incorporated herein by reference.

FIELD

The present disclosure relates to trimmers. More particularly, the present disclosure relates to accessories for a string trimmer head.

BACKGROUND

Generally, trimmers are used to cut grass and weeds and are often used to edge around trees, near fences and walls, and along landscape borders. Conventional string trimmers include an elongated shaft with a rotating element or head near the end of the elongated shaft, and a spool or string head is attached to the gear head. Typically, the string head includes a monofilament line (i.e., trimmer/cutting line) rotated by the head for cutting and trimming along landscaped areas, fences, walls, etc.

SUMMARY

The present disclosure provides, in one aspect, a string trimmer assembly including a trimmer head rotatably driven by a drive shaft, the trimmer head defining a cavity, a spool supported in the cavity of the trimmer head and operable to support line to be dispensed, the line dispensable though an opening in the trimmer head, and a bump protruding from a distal end of the trimmer head, wherein the bump includes a wear surface on a terminating end of the bump, and wherein the wear surface and the opening defining a cutting height.

The present disclosure provides, in another aspect, a string trimmer assembly including an output shaft, a first trimmer head housing a spool of cutting line dispensable though an opening in the first trimmer head, the first trimmer head including a bump protruding from a distal end of the first trimmer head and defining a first cutting height, and a second trimmer head housing a spool of cutting line dispensable though an opening in the second trimmer head, the second trimmer head including a bump protruding from a distal end of the second trimmer head and defining a second cutting height, wherein the first cutting height is different than the second cutting height, and wherein the first trimmer head and the second trimmer head are each selectively removably coupled to the output shaft.

The present disclosure provides, in yet another aspect, a trimmer head for use with a string trimmer assembly, the trimmer head including a top plate, a body, the body and the top plate defining a cavity, a spool supported in the cavity and operable to support line to be dispensed, the line dispensable though an opening in the body, a nut coupled to the spool, a retainer coupled to the body, the retainer configured to accommodate axial and rotational play between the spool and the body, and a bump protruding from a distal end of the body, the bump including a wear surface on a terminating end thereof, the wear surface and the opening defining a cutting height.

Features and aspects of the disclosure will become apparent by consideration of the following detailed description and accompanying drawings.

BRIEF DESCRIPTION OF THE DRAWINGS

FIG. 6A is a side elevation view of the trimmer head FIG. 2 and the accessory of FIG. 5, illustrating a first cutting height.

FIG. 6B is a side elevation view of the trimmer head FIG. 2 and an accessory for setting a cutting height, according to embodiments disclosed herein, illustrating a second cutting height.

FIG. 6C is a side elevation view of the trimmer head FIG. 2 and an accessory for setting a cutting height, according to embodiments disclosed herein, illustrating a third cutting height.

Before any independent embodiments of the disclosure are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

DETAILED DESCRIPTION

Figure 1:
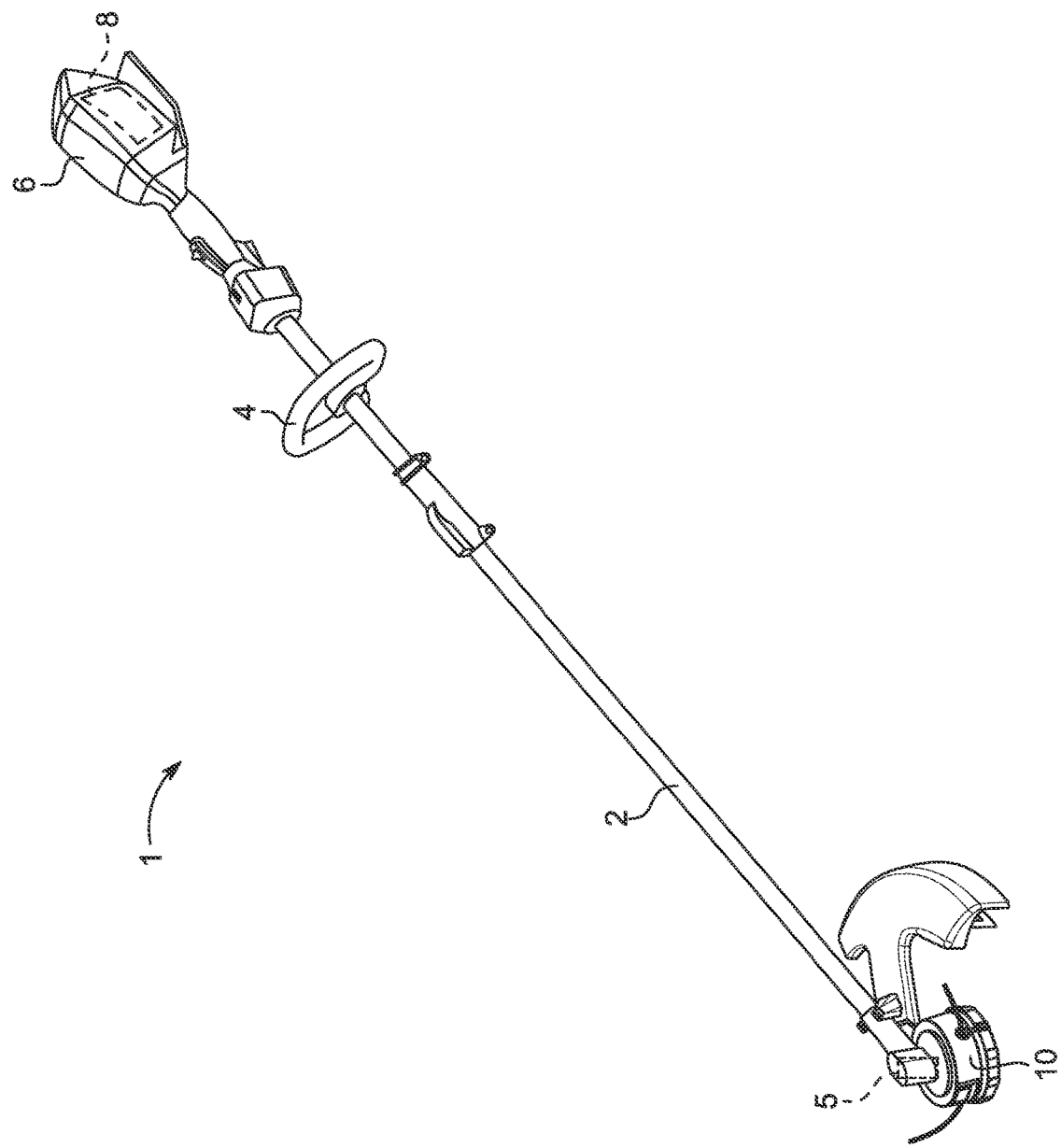
FIG. 1 is a perspective view of a string trimmer.
Figure 2:
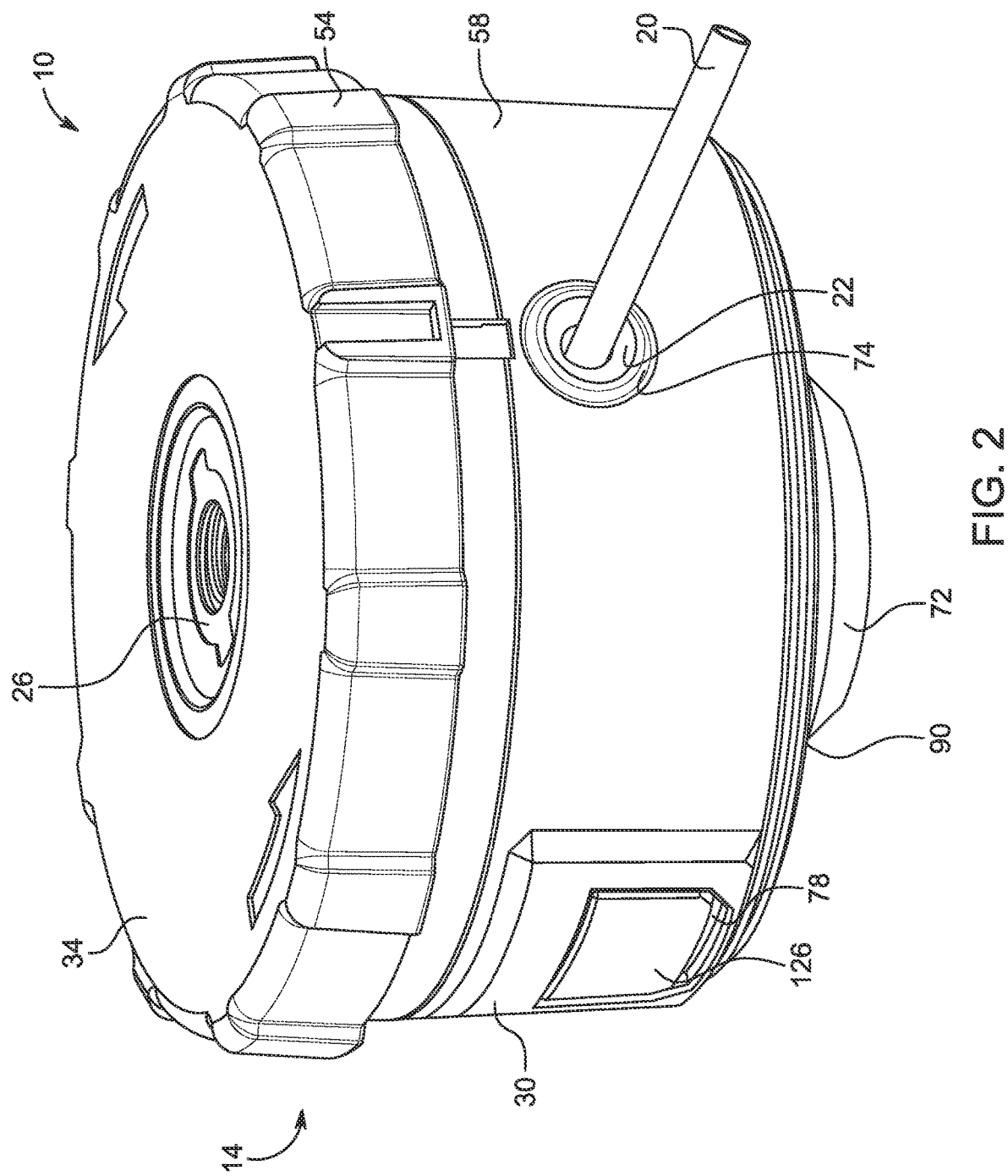
FIG. 2 is a perspective view of a trimmer head.
Figure 3:
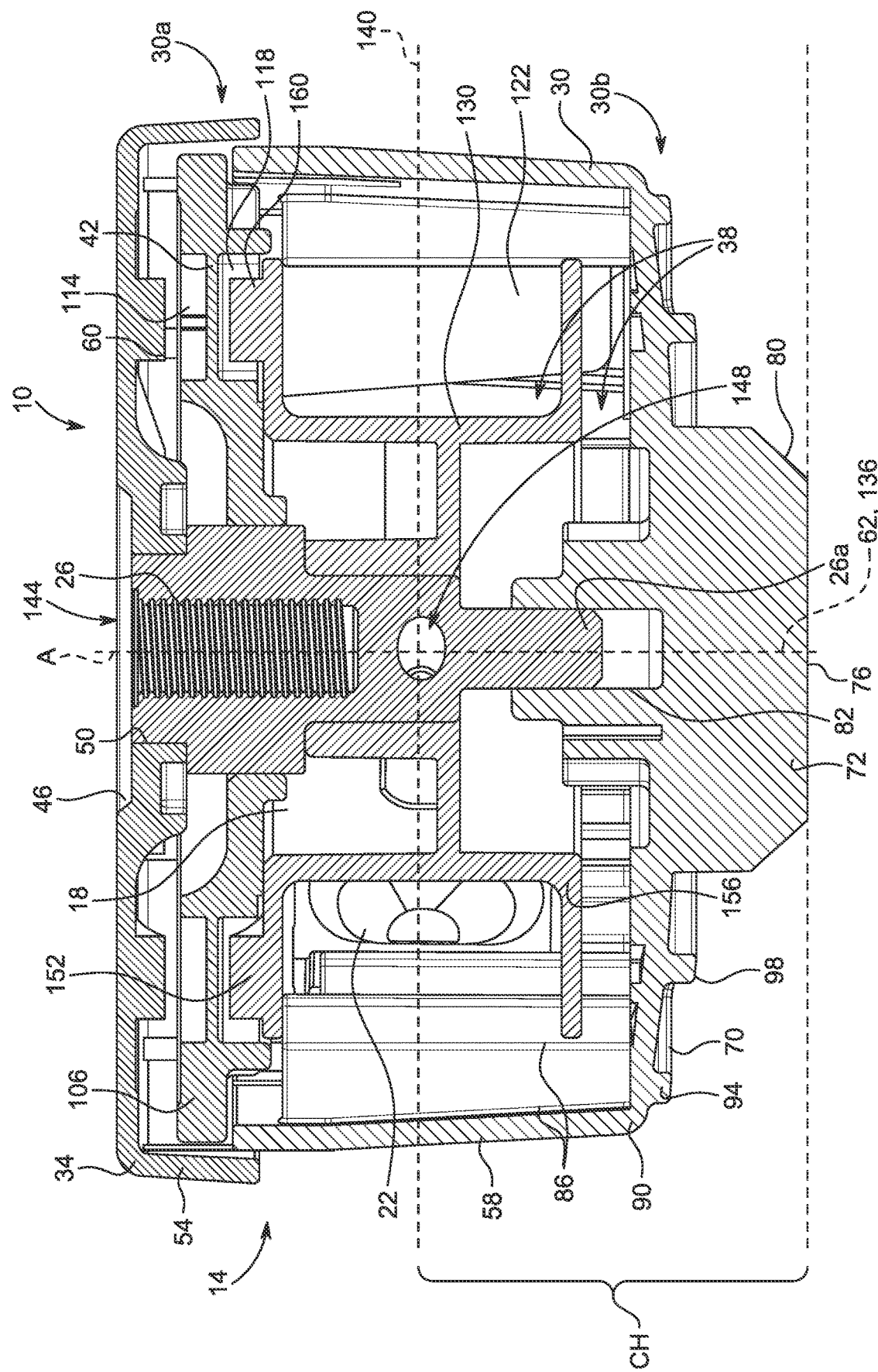
FIG. 3 is a cross-sectional view of the trimmer head of FIG. 2.
Figure 4:
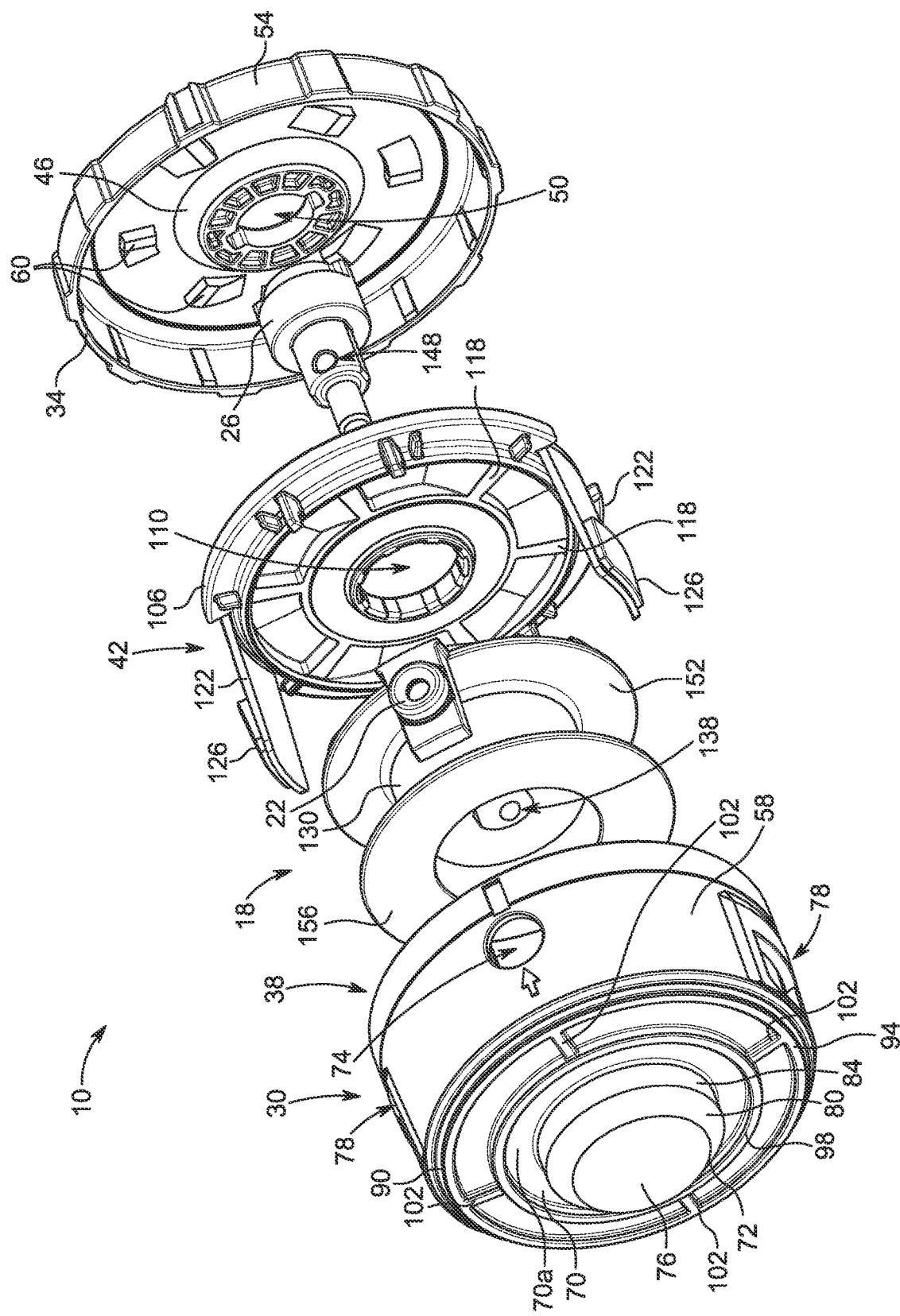
FIG. 4 is an exploded perspective view of the trimmer head of FIG. 2.

FIGS. 2-4 illustrate a trimmer head 10 for use on an example string trimming tool, such as a trimmer 1 (FIG. 1). As shown in FIG. 1, the trimmer 1 generally includes a shaft 2 with a handle 4 toward one end and a motor housing 6 enclosing an electric motor 8 with a motor-driven output, or drive shaft 5, for connection to a trimmer head 10 on the other end. Various powered trimmers (e.g., battery-powered, gas-powered, etc.) may be used with the trimmer head 10.

As shown in FIGS. 2-4, the illustrated trimmer head 10 includes a housing 14 rotatable about an axis A and a spool 18 positioned in the housing 14 for retaining one or more cutting lines 20. Cutting line 20 is wound around the spool 18 and extends through opposed eyelets 22 to cut vegetation (e.g., grass, weeds, etc.). In the illustrated embodiment, the trimmer head 10 is mounted to the drive shaft 5 of the trimmer 1 via the spool 18. In other words, the spool 18 is drivingly connected to the drive shaft 5, and the trimmer head 10 is categorized as a "spool mounted trimmer head." In particular, a nut 26 configured to be drivingly connected to the drive shaft may be insert molded into the spool 18.

In other embodiments, the trimmer head 10 is mounted to the drive shaft 5 via the housing 14, rather than via the spool 18. In such embodiments, a main body 30 and a cap or top plate 34 of the main body 30 are rotatably and axially fixed to the drive shaft 5, and the trimmer head 10 is categorized as a "housing mounted trimmer head."

Referring still to FIGS. 2-4, the housing 14 includes the main body 30 and the top plate 34. The top plate 34 is spaced above the spool 18 (FIG. 3) and is keyed to the insert molded nut 26. The spool 18 and the top plate 34 are thus fixed to one another rotatably and axially via the insert molded nut 26 to thereby move together. The main body 30 defines a cavity 38 for receiving the spool 18. A retainer, such as a retainer ring 42, is positioned at the upper end of the main body 30. The retainer ring 42 is located on the insert molded nut 26 and is captured with axial and rotational play between the top plate 34 and an upper end of the spool 18. A spring (not shown) is located at a lower end of the spool 18 to bias against a lower portion of the housing 14.

In the illustrated embodiment, the top plate 34 is generally cylindrical and includes a boss 46 (e.g., a center boss) having an aperture 50 extending through the boss 46. The aperture 50 is shaped and sized to fixedly receive the insert molded nut 26. An outer rim 54 of the top plate 34 covers an end of a sidewall 58 of the main body 30 to enclose the cavity 38. A series of teeth 60 are positioned on an inner surface of the top plate 34 and are engageable with a corresponding series of teeth positioned on the retainer ring 42.

The main body 30 is generally cylindrical and includes a first end 30a, a second end 30b opposite the first end 30a, and a longitudinal axis 62 extending from the first end 30a to the second end 30b. The longitudinal axis 62 is collinear to the rotational axis A. The main body 30 additionally includes the sidewall 58, a base wall 70, and a protuberance, such as a wear bump or bump 72, positioned on the base wall 70. The sidewall 58 defines a pair of eyelet openings 74 and a pair of retainer openings 78. The eyelet openings 74 are shaped and sized to receive the eyelets 22, and the retainer openings 78 are shaped and sized to receive at least a portion of the retainer 42. An inner surface of the base wall 70 includes a center boss 82 and one or more ribs 86. The center boss 82 is shaped and sized to receive a portion of the insert molded nut 26. The ribs 86 axially extend from the base wall 70 and are configured to interface with the spool 18.

Referring to FIGS. 2-5, the wear bump 72 may be a generally domed-shaped protuberance extending from the base wall 70 on the main body 30. In the illustrated embodiment, the wear bump 72 is a rigid body having a wear surface 76 delimited by a generally annular chamfered edge 80. The chamfered edge 80 extends between the wear surface 76 and a body 84 of the wear bump 72. In some embodiments, the chamfered edge 80 is angled or chamfered at an angle from about 10 degrees to about 75 degrees. In other embodiments, the chamfered edge 80 is omitted. As will be described in greater detail below, the wear bump 72 provides a body or boss upon which a user may "bump" the trimmer head 10 during operation to extend additional line 20 from the spool 18. The wear bump 72 further allows a user to rely on a height of the wear bump 72 to determine a cutting height CH (FIGS. 3 and 6A-6C) of the trimmer head 10. Furthermore, the wear bump 72 is positioned on the main body 30 to prevent damage to the housing 14 of the trimmer head 10 during the "bumping" or cutting action.

Figure 5:
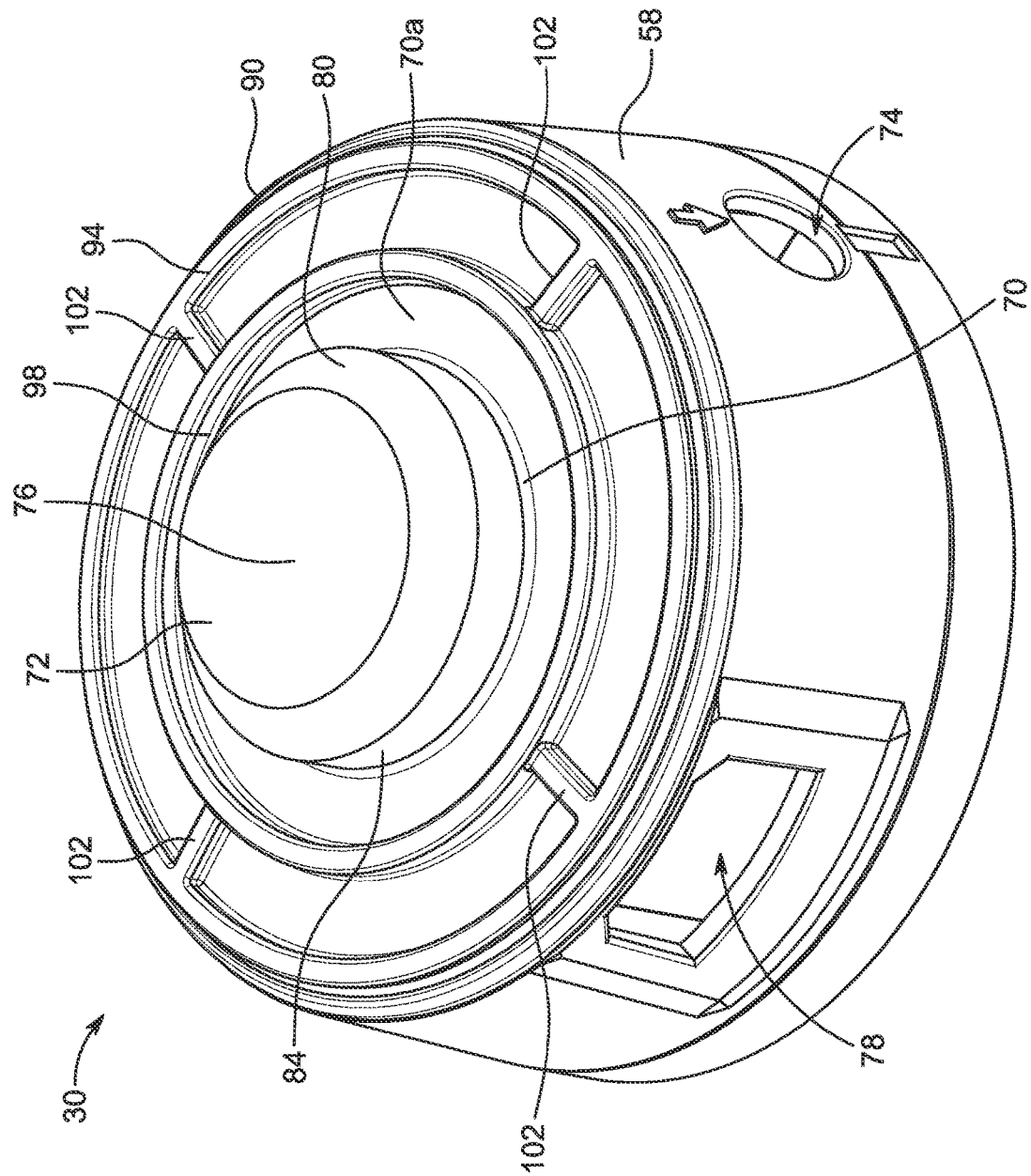
FIG. 5 is a perspective view of a housing of the trimmer head of FIG. 2, the housing including an accessory for setting a cutting height, according to embodiments disclosed herein.

With reference to FIGS. 4 and 5, an edge 90 is formed on an outer surface of the main body 30 at a junction between the sidewall 58 and the base wall 70. More specifically, the edge 90 is generally chamfered. In the illustrated embodiments, the edge 90 includes a 35-degree chamfer. However, in some embodiments, the edge 90 may include a chamfer of different sizes.

With continued reference to FIGS. 4-6, an outer surface 70a of the base wall 70 includes a first wear ring 94 and a second wear ring 98. The first and second wear rings 94, 98 are generally circular and protrude from the base wall 70. The outer surface 70a of the base wall 70 additionally includes ribs 102 protruding from the main body 30. The ribs 102 are positioned between the first wear ring 94 and the second wear ring 98 and are equidistantly circumferentially spaced on the base wall 70 about the longitudinal axis 62. In the illustrated embodiments, the main body 30 includes four ribs 102. However, in alternative embodiments, the main body 30 may include fewer or additional ribs. The ribs 102 include a thickness equal to the thickness of the wear rings 94, 98.

During operation (e.g., a cutting operation) of the trimmer 1, the trimmer head 10 may be bumped against a work surface. The angle at which the trimmer head 10 is oriented relative to the work surface as it is "bumped" may depend on the height of the user. For example, typically the base wall 70 of the trimmer head 10 is oriented within a range of 0-45 degrees relative to the work surface as it is being "bumped." In some instances in which the wear bump 72 does not extend beyond the wear rings 94, 98, the wear rings 94, 98 and/or chamfered edge 90 prevent damage to the housing 14 of the trimmer head 10, regardless of the angle at which the base wall 70 is oriented relative to the work surface. In other instances, in which the wear bump 72 extends beyond the wear rings 94, 98 (e.g., along the longitudinal axis 62), for example, the wear bump 72 and chamfered edge 90 of the main body 30 protect the housing 14. As illustrated in FIGS. 6A-6C, an amount the wear bump 72 extends beyond the base wall 70 impacts an amount the trimmer head 10 is rotated before the chamfered edge 90 contacts the work surface.

With reference to FIGS. 3 and 4, the retainer 42 includes a ring 106 defining a central opening 110. The retainer 42 includes a first series of teeth 114 positioned on an upper surface of the ring 106, and a second series of teeth 118 positioned on a lower surface of the ring 106. The first series of teeth 114 are engageable with the teeth 60 positioned on the top plate 34 of the housing 14. Flexible retainer arms 122 extend from the ring 106, each having a retainer member 126 engageable in the associated retainer openings 78 to connect the main body 30 and the retainer 42.

With continued reference to FIGS. 3 and 4, the spool 18 includes a generally cylindrical, central body 130 including a through bore extending through the spool 18 along an axis 136 generally collinear to the longitudinal axis 62. An aperture 138 extends through the central body 130 for receiving line 20, such that the aperture 138 extends radially outwardly along an axis 140 (e.g., cutting plane) substantially perpendicular to the longitudinal axis 62. With brief reference to FIGS. 6A-6C, the cutting height CH of the trimmer head 10 is defined between the axis 140 (e.g., plane in which the cutting line 20 extends immediately after exiting the aperture 138) and the wear surface 76 of the wear bump 72. During the cutting operation of the trimmer head 10, in which the cutting line 20 extends outwardly generally along the axis 140, the wear bump 72 can be set on the working surface to provide a guide for the user. This operation assists the user in cutting vegetation at a consistent desired height. More simply, the wear bump 72 may be utilized by a user to float the trimmer head 10 along the working surface at a set height while protecting the housing 14 from damage.

Returning to FIG. 3, the through bore defined in the central body 130 is shaped and sized to receive the insert molded nut 26. The insert molded nut 26 is positioned within the through bore and includes a threaded opening 144 shaped and sized to receive the drive shaft 5 of the trimmer 1. In order to couple the trimmer head 10 to the drive shaft 5, the nut 26 is tightened around the drive shaft 5. A distal end 26a of the insert molded nut 26 protrudes through the spool 18 and is received within the center boss 82 of the main body 30 of the housing 14. The insert molded nut 26 additionally includes an aperture 148 that extends through the insert molded nut 26 along an axis 140 generally perpendicular to the longitudinal axis 62. Specifically, the aperture 148 of the insert molded nut 26 aligns with the aperture 138 of the spool 18, thereby forming a passageway for cutting line 20 to be fed through the housing 14, the spool 18, and the insert molded nut 26.

The central body 130 of the spool 18 includes a first, upper flange 152 and a second, lower flange 156. The first flange 152 and the second flange 156 are arranged in parallel planes. In some embodiments, the spool 18 may include additional flanges. Teeth 160 are formed on the upper flange 152 and are selectively engageable with the second series of teeth 118 on the retainer 42.

A spring is located at the lower end of the spool 18 to bias against the housing 14. In the biased position, the retainer 42 and housing 14 are biased downwardly by the spring and the spool 18 is drivingly connected to the housing 14 via the second series of teeth 118 located on the lower surface of the retainer 42 cooperating with the teeth 160 on the upper flange 152 of the spool 18.

To install cutting line 20, an end of a single cutting line 20 is fed through the passageway in one eyelet 22, into and through the aperture 138 of the spool 18 and the aperture 148 of the nut 26. The end of the cutting line 20 is then fed through the passageway in the other eyelet 22, such that an equal amount of line extends from each eyelet 22. The cutting line 20 is centered and then wound onto the spool 18 (e.g., by turning the housing 14 in a direction opposite to a feed direction while holding the top plate 34) until sufficient cutting line 20 extends from each eyelet 22.

In operation, the trimmer 1 is operated to rotate the drive shaft 5 and, thereby, the spool 18. As mentioned above, in the biased, initial position, the housing 14 and the retainer 42 are biased downwardly via the biasing spring, and the spool 18 is drivingly connected to the housing 14 via the plurality of cooperating teeth 118, 160 located on the retainer 42 and the top end of the spool 18. As a result, the trimmer 1 can be operated to rotate the drive shaft 5, thereby rotating the spool 18 (along with the housing 14 and the retainer 42) and the cutting line 20 so that the line 20 may cut vegetation.

As the trimmer head 10 is being operated, the trimmer head 10 may be "bumped" against the work surface, for example, to dispense additional cutting line 20. The housing 14 (e.g., main body 30) and the retainer 42 move axially on the insert molded nut 26 against the spring bias to disengage the cooperating teeth (e.g., teeth 160, 118) on the top of the spool 18 and the bottom of the retainer 42. With these cooperating teeth 160, 118 disengaged, the housing 14 is free to rotate relative to the spool 18 so as to dispense additional line. The housing 14 may be depressed until the retainer 42 engages the top plate 34. At this time, a plurality of cooperating interfaces (e.g., ramps or teeth 114 formed on the bottom of the top plate 34, and ramps or teeth 60 formed on the top of the retainer 42) engage with one another so as to momentarily drivingly connect the housing 14 with the spool 18. Once the housing 14 disengages the surface, the spring biases the housing 14 and the retainer 42 downwardly into the biased position. As the cooperating interfaces 60, 114 on the bottom of the top plate 34 and the top of the retainer 42 are disengaged, the housing 14 is again free to rotate relative to the spool 18 so as to dispense additional line 20 until the cooperating teeth 160, 118 on the top of the spool 18 and the bottom of the retainer 42 become engaged in the biased position.

Because the wear bump 72 is positioned on the bottom of the base wall 70 of the main body 30, the wear bump 72 contacts the work surface rather than the base wall 70. Therefore, the housing 14 is protected from wear against the ground. In some instances, in the event that the user bumps the trimmer head 10 against the ground at an angle (e.g., the base wall 70 is oriented at an angle relative to the work surface), the chamfered edge 90 of the main body 30 may contact the work surface rather than the sidewall 58 and/or the base wall 70, thereby protecting the housing 14 from wear.

With specific reference to FIGS. 6A-6C, trimmer heads 10, 10', 10" incorporating different sized wear bumps 72, 72', 72" may be selectively used with the trimmer 1. Components that are similar to those described in the trimmer head 10 have the same reference number with one or more apostrophes.

FIG. 6A illustrates the trimmer head 10 and wear bump 72, and the body 84 of the wear bump 72 has a height constituting a portion of the cutting height CH. During operation of the trimmer 1 with the trimmer head 10 attached, a user may expect that the cutting height CH will stay constant. As discussed above, the main body 30 and wear bump 72 move together, axially and rotationally, such that the cutting height CH does not change during "bumping" of the housing 14.

FIG. 6B illustrates a trimmer head 10' having a wear bump 72' that defines a cutting height CH' greater than the cutting height CH of the trimmer head 10 illustrated in FIG. 6A. FIG. 6C illustrates a trimmer head 10" having a wear bump 72" that defines a cutting height CH" greater than the cutting height CH' of the trimmer head 10' illustrated in FIG. 6B and the cutting height CH of the trimmer head 10 illustrated in FIG. 6A. It should be understood that any size of wear bump may be provided with the trimmer head depending on an operator's desired cutting height. In some embodiments, a wear bump similar to the wear bump 72 may be removably coupled to the trimmer head. In other embodiments, the first and second wear rings 94, 98 extend from the main body 30 by different amounts, and the wear bump 72 is omitted. In such embodiments, the cutting height is defined between and including the axis 140 and a distal end of the first and second wear rings 94, 98.

When operating the trimmer 1 with the trimmer head 10 attached, the working surface is primarily contacted by the wear bump 72 when the trimmer 1 is oriented within a first range of angles A1 (e.g., 0 degrees relative the work surface to about 45 degrees). Once the trimmer 1 leaves the first range of angles A1, the working surface may be contacted by the wear bump and the edge 90. When operating the trimmer 1 with the trimmer head 10' attached, the working surface is primarily contacted by the wear bump 72' when the trimmer 1 is oriented within a second range of angles A2 (e.g., 0 degrees relative the work surface to about 65 degrees). Once the trimmer 1 leaves the second range of angles A2, the working surface may be contacted by the wear bump 72' and the edge 90'. When operating the trimmer 1 with the trimmer head 10" attached, the working surface is primarily contacted by the wear bump 72" when the trimmer 1 is oriented within a third range of angles A3 (e.g., 0 degrees relative the work surface to about 75 degrees). Once the trimmer 1 leaves the third range of angles A3, the working surface may be contacted by the wear bump 72" and the edge 90".

Each of the trimmer heads 10, 10', 10" may be sold or provided separately from the trimmer 1. Providing separate trimmer heads 10, 10', 10" each having differently sized wear bumps 72, 72', 72" allows the trimmer 1 to be operated with differently set cutting heights CH, CH', CH", without requiring the use of a different trimmer altogether. In other embodiments, each of the wear bumps 72, 72', 72" are selectively removably coupled to a single trimmer head.

Although aspects of the invention have been described in detail with reference to certain preferred constructions, variations and modifications exist within the scope and spirit of one or more independent aspects of the invention as described. For example, as discussed above, the illustrated wear bump could be provided on both spool mounted trimmer heads and housing mounded trimmer heads.

Various features of the disclosure are set forth in the following claims.

What is claimed is:

1. A string trimmer assembly comprising:
   a trimmer head rotatably driven by a drive shaft, the trimmer head defining a cavity;
   a spool supported in the cavity of the trimmer head and operable to support line to be dispensed, the line dispensable though an opening in the trimmer head; and
   a bump protruding from a distal end of the trimmer head;
   wherein the bump includes a wear surface on a terminating end of the bump,
   wherein the wear surface and the opening defining a cutting height;
   wherein the trimmer bead is bumpable against a surface to dispense additional line from the opening, and
   wherein the cutting height remains constant.

2. The string trimmer assembly of claim 1, further comprising
   a drive shaft configured to be driven by a motor; and
   a housing,
   wherein the trimmer head is configured to be mounted to the drive shaft via the spool.

3. The string trimmer assembly of claim 2, wherein the wear surface of the trimmer head is bumpable against the surface to inhibit damage to the housing.

4. The string trimmer assembly of claim 1, wherein the bump is dome shaped.

5. The string trimmer assembly of claim 4, wherein the bump includes an annular chamfered edge extending between the terminating end and a body of the bump.

6. The string trimmer assembly of claim 5, wherein the annular chamfered edge is configured to contact the surface.

7. A trimmer head for use with a string trimmer assembly, the trimmer head comprising:
   a top plate;
   a body, the body and the top plate defining a cavity;
   a spool supported in the cavity and operable to support line to be dispensed, the line dispensable though an opening in the body;
   a nut coupled to the spool;
   a retainer coupled to the body, the retainer configured to accommodate axial and rotational play between the spool and the body; and
   a bump protruding from a distal end of the body, the bump including a wear surface on a terminating end thereof, the wear surface and the opening defining a cutting height,
   wherein the wear surface of the bump is bumpable against a surface to dispense additional line from the opening; and
   wherein the cutting height remains constant.

8. The trimmer head of claim 7, wherein the wear surface of the bump is bumpable against the surface to move the body axially toward the top plate and momentarily inhibit relative axial and rotational play between the top plate and the body, thereby rotating the spool relative to the body and dispensing the additional line from the opening.

9. The trimmer head of claim 2, wherein the wear surface is bumpable against the surface to inhibit damage to the body.

* * * * *